(12) United States Patent
Bignotti et al.

(10) Patent No.: US 11,709,952 B2
(45) Date of Patent: Jul. 25, 2023

(54) SYSTEM AND METHOD OF DIFFERENTIAL ACCESS CONTROL OF SHARED DATA

(71) Applicant: AMADEUS S.A.S., Biot (FR)

(72) Inventors: Catherine Bignotti, Juan-les-Pins (FR); Bertrand Alberola, La Roquette-sur-Siagne (FR); Veronique Leroy, Biot (FR); Jean-Chafic Hays, Nice (FR); Pierre Brun, Valbonne (FR)

(73) Assignee: AMADEUS S.A.S., Biot (FR)

( * ) Notice: Subject to any disclaimer, the term of this patent is extended or adjusted under 35 U.S.C. 154(b) by 102 days.

(21) Appl. No.: 16/699,205

(22) Filed: Nov. 29, 2019

(65) Prior Publication Data

US 2021/0165896 A1 Jun. 3, 2021

(51) Int. Cl.
*G06F 21/62* (2013.01)

(52) U.S. Cl.
CPC .................... *G06F 21/62* (2013.01)

(58) Field of Classification Search
CPC ... G06F 21/60–6245; G06F 2221/2113; G06F 2221/2141; H04L 63/10–105
See application file for complete search history.

(56) References Cited

U.S. PATENT DOCUMENTS

| | | | | |
|---|---|---|---|---|
| 5,671,428 A * | 9/1997 | Muranaga | ............... | G06Q 10/10 715/201 |
| 8,000,984 B2 * | 8/2011 | Hasan | .................... | G16H 80/00 705/3 |
| 2002/0069219 A1 * | 6/2002 | Weng | .................. | G06F 16/9577 715/202 |
| 2006/0010075 A1 * | 1/2006 | Wolf | ...................... | G06Q 30/06 705/57 |
| 2006/0015499 A1 * | 1/2006 | Clissold | .................. | G06F 16/10 |
| 2006/0074913 A1 * | 4/2006 | O'Sullivan | ......... | G06F 21/6218 707/999.009 |

(Continued)

OTHER PUBLICATIONS

Haddad, M., Hacid, M. S., & Laurini, R. (Jun. 2012). Data integration in presence of authorization policies. In 2012 IEEE 11th International Conference on Trust, Security and Privacy in Computing and Communications (pp. 92-99). IEEE.

(Continued)

*Primary Examiner* — Madhuri R Herzog
(74) *Attorney, Agent, or Firm* — Perry + Currier

(57) ABSTRACT

A method of data access control in an intermediation server includes: storing a record containing: a record identifier; a plurality of sections each containing data; and in association with each section, an owner identifier selected from a set of requester identifiers corresponding to respective requester subsystems; storing access control data corresponding to each requester identifier; wherein the access control data for a given requester identifier indicates which other requester identifiers are permitted to access a section of the record having the given requester identifier associated therewith as the owner identifier; responsive to receiving, from one of the requester subsystems, a request containing the record identifier and an active one of the requester identifiers corresponding to the active requester subsystem: granting access to a subset of the sections according to the active requester identifier, the owner identifiers and the access control data.

23 Claims, 6 Drawing Sheets

(56) References Cited

U.S. PATENT DOCUMENTS

| | | | |
|---|---|---|---|
| 2010/0158254 A1* | 6/2010 | Schaad | G06F 21/6209 380/282 |
| 2014/0281856 A1* | 9/2014 | Byrne | G06F 40/194 715/205 |
| 2015/0248384 A1* | 9/2015 | Luo | G06F 40/197 715/229 |
| 2015/0248560 A1* | 9/2015 | Pathak | G06F 21/00 726/26 |
| 2016/0378874 A1* | 12/2016 | Jafri | H04L 67/02 707/706 |
| 2018/0357444 A1 | 12/2018 | Kammath et al. | |

OTHER PUBLICATIONS

De Capitani Di Vimercati, Sabrina, and Pierangela Samarati. "Access control in federated systems." Proceedings of the 1996 workshop on New security paradigms. 1996. p. 88.

* cited by examiner

SYSTEM AND METHOD OF DIFFERENTIAL ACCESS CONTROL OF SHARED DATA

FIELD

The specification relates generally to data storage, and specifically to a system and method of differential access control of shared data.

BACKGROUND

The performance of various tasks, such as the provision of items (e.g. travel-related products and services) from providers to consumers, may involve interaction between a number of distinct computing subsystems operated by different entities. To enable the system as a whole to successfully perform the relevant task, some of the above computing subsystems may use common sets of data. In addition, however, certain computing subsystems may use data that is specific and/or exclusive to those subsystems, alongside the common sets of data. Maintaining separation between common data and exclusive or otherwise limited-access data may introduce errors and/or greater computational complexity in the storage and synchronization of the common sets of data.

SUMMARY

An aspect of the specification provides a method of data access control, comprising: storing, at an intermediation server, a record containing: (i) a primary record identifier; (ii) a plurality of sections each containing data; and (iii) in association with each section, an owner identifier selected from a set of requester identifiers corresponding to respective requester subsystems; storing, at the intermediation server, access control data corresponding to each requester identifier; wherein the access control data for a given requester identifier indicates which other requester identifiers are permitted to access a section of the record having the given requester identifier associated therewith as the owner identifier; responsive to receiving, at the intermediation server from an active one of the requester subsystems, a request containing (i) the primary record identifier and (ii) an active one of the requester identifiers corresponding to the active requester subsystem: granting access to a subset of the sections according to the active requester identifier, the owner identifiers and the access control data.

Another aspect of the specification provides an intermediation server, comprising: a communications interface; a memory configured to store: a record containing (i) a primary record identifier; (ii) a plurality of sections each containing data; and (iii) in association with each section, an owner identifier selected from a set of requester identifiers corresponding to respective requester subsystems; and access control data corresponding to each requester identifier; wherein the access control data for a given requester identifier indicates which other requester identifiers are permitted to access a section of the record having the given requester identifier associated therewith as the owner identifier a processor interconnected with the memory and the communications interface, the processor configured to: responsive to receipt, from an active one of the requester subsystems, a request containing (i) the primary record identifier and (ii) an active one of the requester identifiers corresponding to the active requester subsystem: grant access to a subset of the sections according to the active requester identifier, the owner identifiers and the access control data.

A further aspect of the specification provides a non-transitory computer-readable medium storing computer-readable instructions executable by a processor of an intermediation server to cause the intermediation server to: store, at the intermediation server, a record containing: (i) a primary record identifier; (ii) a plurality of sections each containing data; and (iii) in association with each section, an owner identifier selected from a set of requester identifiers corresponding to respective requester subsystems; store, at the intermediation server, access control data corresponding to each requester identifier; wherein the access control data for a given requester identifier indicates which other requester identifiers are permitted to access a section of the record having the given requester identifier associated therewith as the owner identifier; responsive to receipt, at the intermediation server from an active one of the requester subsystems, of a request containing (i) the primary record identifier and (ii) an active one of the requester identifiers corresponding to the active requester subsystem: grant access to a subset of the sections according to the active requester identifier, the owner identifiers and the access control data.

BRIEF DESCRIPTIONS OF THE DRAWINGS

Embodiments are described with reference to the following figures, in which.

DETAILED DESCRIPTION

Figure 1:
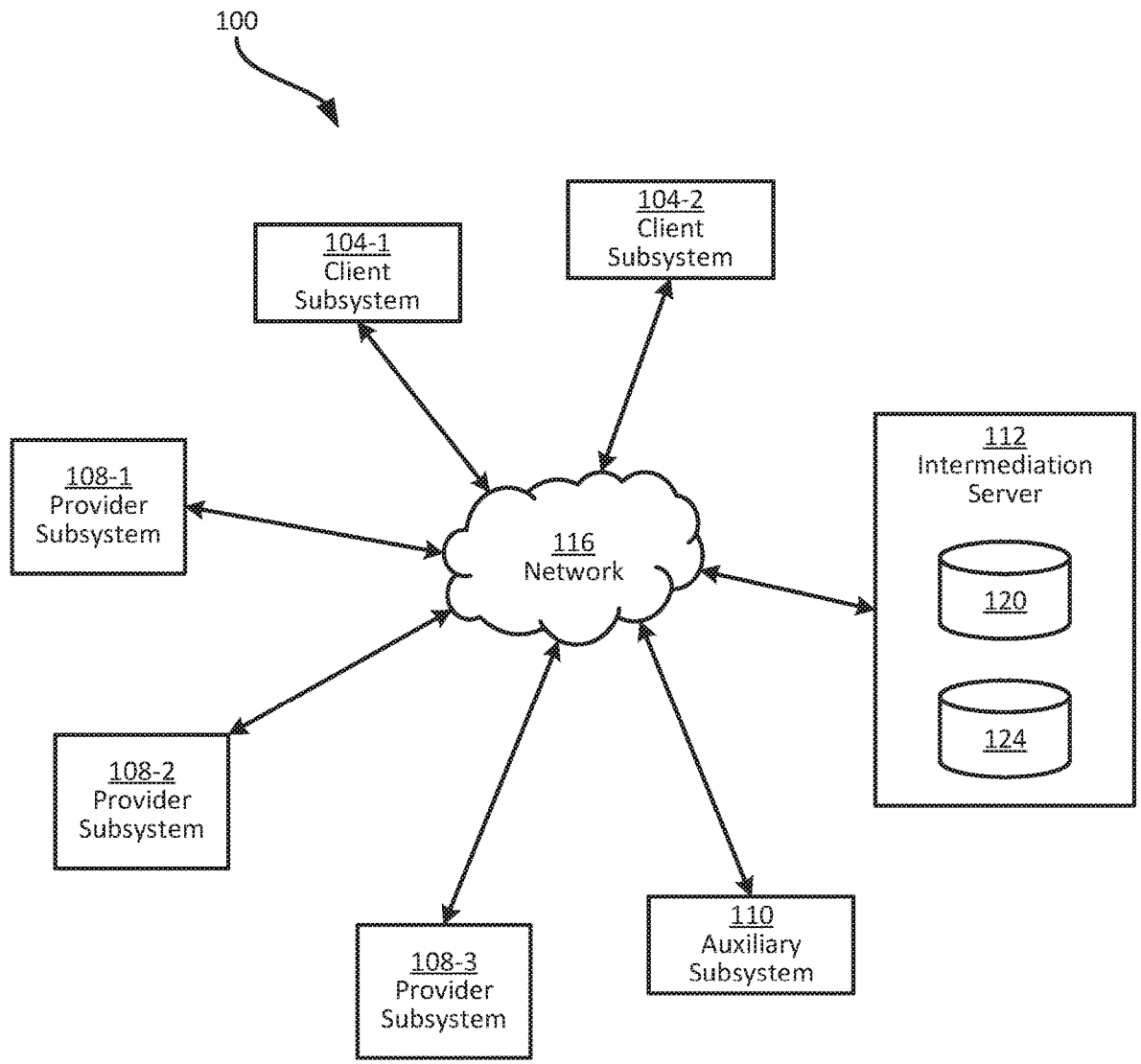
FIG. 1 is a diagram of a system for differential access control of shared data.

FIG. 1 depicts a system 100 for differential access control of shared (or partially shared) data. Within the system 100, various computing subsystems generate requests associated with the data, including requests to view or otherwise present the data (e.g. on a display), and requests to edit the data. The above-mentioned subsystems may be generally referred to as requester subsystems. The system 100 can include various types of requester subsystems, each of which may be operated by different entities. The nature of the entity operating each requester subsystem defines which subsets of the above-mentioned data are processed (e.g. updated or otherwise accessed) by that requester subsystem.

The nature of the data, and of the entities operating the requester subsystems, is not particularly limited. In the illustrated example discussed below, however, the requester subsystems are operated by provider entities and seller, or client, entities. The provider and client entities interact, via respective requester subsystems that they each operate, to deliver items to customers. The items, in the examples, below, are travel-related products and services, such as flight tickets, hotel reservations, vehicle rental reservations, and the like. The provider entities may therefore be airlines, while the client entities may be end-point consumers or travel agencies purchasing the above items on behalf of such consumers. The data handled within the system 100 in such examples includes data defining prices and scheduling for the products or services, identifying and contact information for customers, data defining attributes of various equipment (e.g. aircraft), payment information, and the like. The exchange of data within the system 100 can be implemented according to any suitable standard or combination thereof. For example, the system 100 can implement the New Distribution Capability (NDC) standard, according to which the entities of the system 100 exchange data via predetermined message types and formats.

Certain portions of the above-mentioned data, such as pricing and scheduling information, are shared between client and provider entities (and therefore between their respective requester subsystems). Other portions of the above-mentioned data, however, such as certain contact information, may be used only by the client entities, and access to such data by other entities may be restricted. Further, the system 100 can include requester subsystems operated by multiple distinct client entities and multiple distinct provider entities, and accessibility of various portions of the data employed in fulfilling delivery of a given item or set of items may vary depending on which provider and client entities are responsible for such fulfillment.

In the illustrated example of FIG. 1, the system 100 includes two example client subsystems 104-1 and 104-2 (collectively referred to as client subsystems 104 or simply clients 104, and generically referred to as a client subsystem 104 or simply a client 104). Each client subsystem 104 may be any suitable one of, or any suitable combination of, computing devices including a server, a desktop computer, a mobile computer such as a tablet, and the like. As noted above, each client subsystem 104 in the illustrated example is operated by a distinct client, such as a travel agency, that interacts with provider entities to arrange the purchase and fulfillment of travel-related products and services on behalf of customers.

The system 100 also includes three example provider subsystems 108-1, 108-2 and 108-3. Each provider subsystem 108 may be any suitable one of, or any suitable combination of, computing devices including a server, a desktop computer, a mobile computer such as a tablet, and the like. As noted above, each provider subsystem 108 in the illustrated example is operated by a distinct airline that interacts with the client entities to arrange the purchase and fulfillment of travel-related products and services.

In addition, the system 100 as illustrated includes an auxiliary subsystem 110, which may be operated by an additional entity distinct from the providers and clients mentioned above. For example, the auxiliary subsystem 110 can be operated by a Billing and Settlement Plan (BSP) entity, responsible for intermediating payments between the clients and the providers resulting from the above-mentioned fulfillment of travel-related products and services. Various other auxiliary systems can also be included (not shown), such as other revenue and accounting systems, customer or traveler applications or the like. The auxiliary subsystem 110 may explicitly request portions of the data generated and processed by the subsystems 104 and 108, or may passively receive such data in response to various events, as will be discussed below in greater detail.

The system 100 can include greater or smaller numbers of client subsystems 104, provider subsystems 108, and auxiliary subsystems 110 in other examples. As will now be apparent, the client subsystems 104, provider subsystems 108, and auxiliary subsystems 110 represent various examples of the requester subsystems mentioned earlier. That is, each of the client subsystems 104, provider subsystems 108, and auxiliary subsystems 110 can request access to various subsets of a set of data associated with fulfillment of items defining a travel itinerary.

The system 100 also includes an intermediation server 112 (also referred to herein simply as the server 112) interconnected with each of the client, provider and auxiliary subsystems 104, 108 and 110 via a network 116. The network 116 can include any suitable combination of Local Area Networks (LANs) and Wide Area Networks (WANs), including the Internet.

The intermediation server 112 stores the above-mentioned data in a shared data repository 120. In particular, each set of data associated with fulfillment of items defining a travel itinerary is stored at the intermediation server 112 in a data record to which each of the client subsystems 104, provider subsystems 108 and auxiliary subsystem 110 may request access, That is, each set of data is stored together, in a shared record, in the repository 120. The records in the repository 120 can be, in the present example, NDC Travel Order records. Other approaches to providing differential access to data may separate such a record into multiple distinct records and grant or deny access to each record for a given entity (e.g. a client subsystem 104). However, in a system such as the system 100, in which numerous different computing subsystems may seek to access the data, such approaches may introduce costly complications in synchronizing changes across such separate records.

In contrast to the above approaches to differential access, the intermediation server 112 implements functionality, discussed in greater detail below, to grant differential access to subsets of data within a single given record to the client subsystems 104, provider subsystems 108 and auxiliary subsystem 110. The intermediation server 112 stores a profile repository 124 containing, for at least some of the requester subsystems, access control data defining access rights for other requester subsystems. In addition, the profile repository 124 can include presentation configuration data for each requester subsystem, defining formatting and other display rules according to which data is to be presented to the relevant requester subsystem. The intermediation server 112, in response to any request to access a record in the repository 120, determines whether to grant or deny access to subsets of the data in the relevant record according to both the profile repository 124 and identifiers of certain requester subsystems in the record itself.

It will be understood from the discussion herein that a wide variety of other types of data can also be handled by a wide variety of other types of operating entities. The system 100 or other systems implemented according to the teaching herein, therefore, can be applied to control access to data in various scenarios in which distinct computing subsystems operate on a set of data that is at least partially shared between the computing subsystems. That is, the set of data contained in each record in the repository 120 need not define a travel itinerary.

Before further discussion of the functionality of the various components of the system 100, certain internal components of the intermediation server 112 will be described in connection with FIG. 2.

Figure 2:
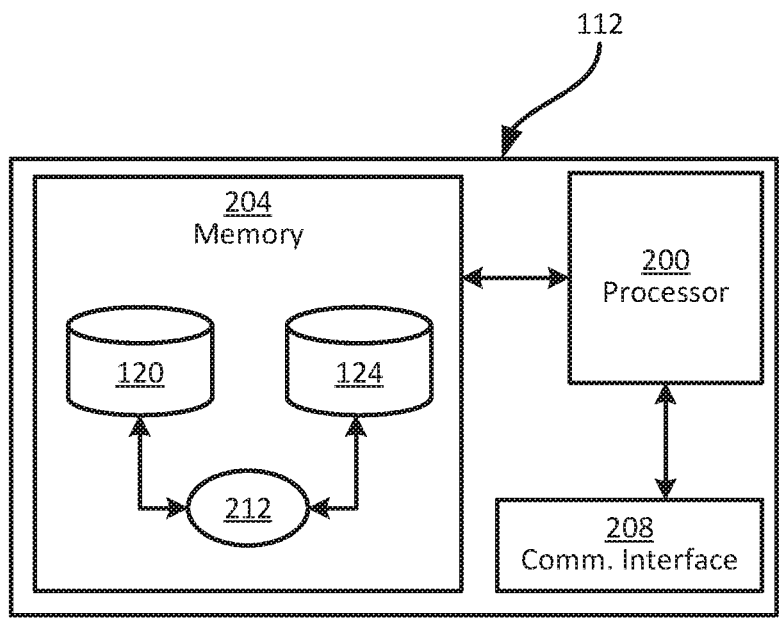
FIG. 2 is a diagram of components of the intermediation server of FIG. 1.

Turning to FIG. 2, the intermediation server 112 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 112 to communicate with the other computing devices of the system 100 via the network 116. The communication interface 208 therefore includes any necessary components (e.g. network interface controllers (NICs), radio units, and the like) to communicate via the network 116. The specific components of the communication interface 208 are selected based on the nature of the network 116. The server 112 can also include input and output devices connected to the processor 200, such as keyboards, mice, displays, and the like (not shown).

The components of the server 112 mentioned above can be deployed in a single enclosure, or in a distributed format. In some examples, therefore, the server 112 includes a plurality of processors, either sharing the memory 204 and communication interface 208, or each having distinct associated memories and communication interfaces. As a result, the repositories 120 and 124 can also be distributed in some examples, according to any suitable mechanism for replicating some or all of the contents of the repositories 120 and/or 124 geographically.

The memory 204 stores the shared data repository 120 and the profile repository 124 mentioned above, as well as computer-readable instructions executable by the processor 200 to implement various functionality. The computer-readable instructions may also be referred to as applications, and in the illustrated example the memory 204 stores an access control application 212 (also referred to herein simply as the application 212). The processor 200 executes the instructions of the application 212 in order to perform various actions defined by the instructions contained therein. In the description below, the processor 200, and more generally the server 112, are said to perform, or to be configured to perform, those actions. It will be understood that they are so configured via the execution (by the processor 200) of the instructions of the applications stored in memory 204. In general, via execution of the application 212, the server 112 implements differential access control for records in the repository 120 according to indicators in those records themselves, as well as data in the profile repository 124.

Figure 3:
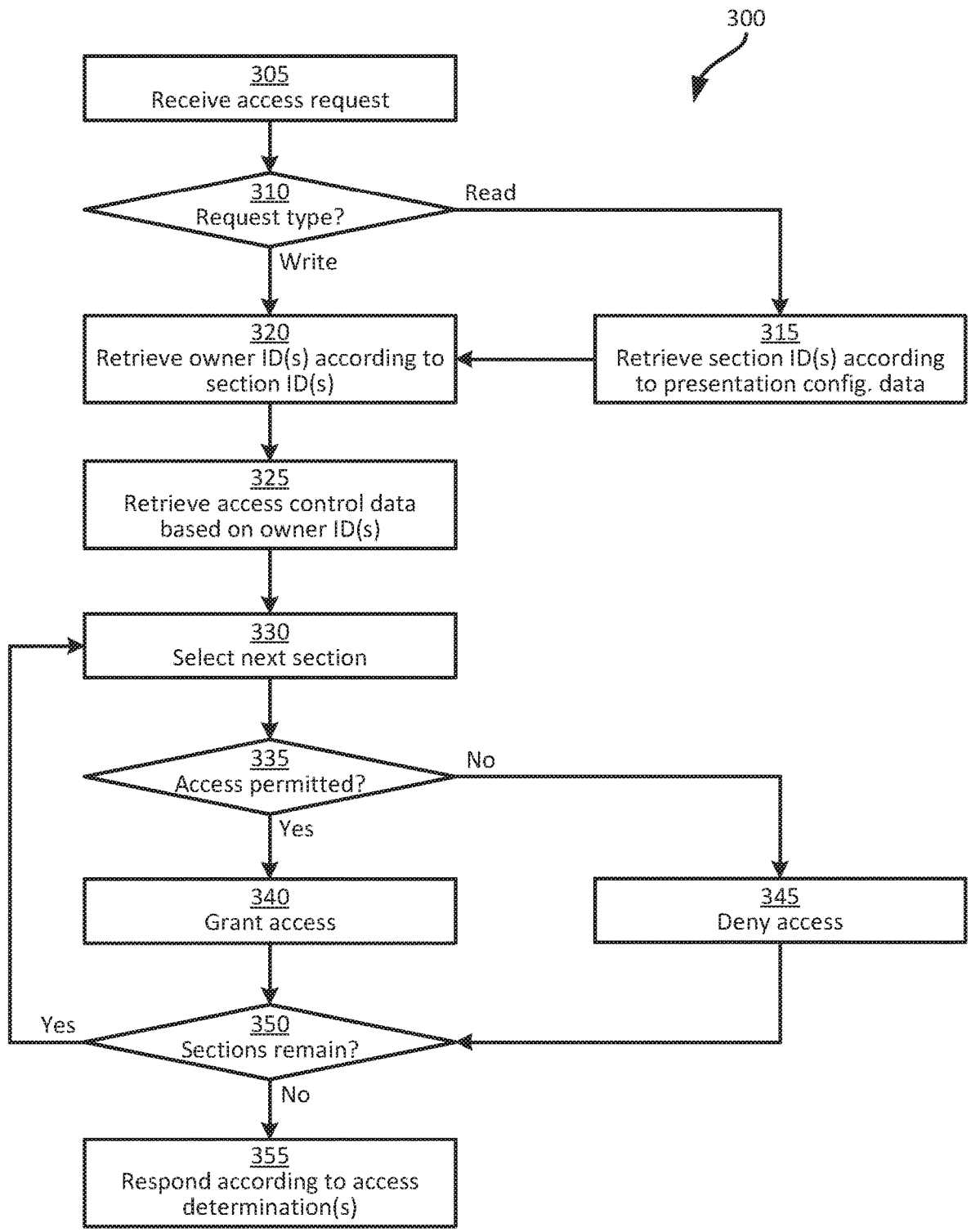
FIG. 3 is a flowchart of a method of differential access control of shared data.

Turning now to FIG. 3, certain aspects of the operation of the system 100 will be described in greater detail. Specifically, FIG. 3 illustrates a method 300 of providing differential access control to shared data, such as data contained in the records of the repository 120. The performance of the method 300 will be described below in conjunction with its performance within the system 100, and in particular by the intermediation server 112.

At block 305, the intermediation server 112 receives a request for access to a record in the repository 120. The request at block 305 can be a request to retrieve a record, e.g. for display at the requester subsystem (e.g. a read request). In other examples, the request received at block 305 can be a request to update a record, to insert or change data therein (e.g. a write request). The request can be received at the intermediate server 112 from any of the above-mentioned requester subsystems (e.g. the client subsystems 104, the provider subsystems 108 or the auxiliary subsystem 110).

The request received at block 305 is generally a request for access on behalf of the sender (i.e. the requester subsystem that originated the request). In some examples, however, the request received at block 305 is a request for access by an entity other than the sender of the request. For example, a provider subsystem 108 can transmit a request for data from a record in the repository 120 to be transmitted to the auxiliary subsystem 110. In further examples, receipt of the request includes generation of the request at the intermediation server 112 itself. For example, the server 112 can be configured, responsive to receiving certain updates to a record (which themselves constitute requests processed via the method 300), to automatically transmit certain data to the auxiliary subsystem 110. Such automatic transmissions can be processed as read requests on behalf of the auxiliary subsystem 110, although the auxiliary subsystem 110 itself did not transmit a request.

The request received at block 305 includes at least a primary record identifier corresponding to one of the records in the repository 120. The primary record identifier can be assigned by the intermediation server 112 upon creation of the record, or by one of the requester subsystems. The primary record identifier is employed by each of the requester subsystems to access the record (i.e. the primary record identifier is a common identifier employed by all requester subsystems to access a particular record). As will be discussed in greater detail below, the request received at block 305 can also include other parameters, such as an indication of whether the request is a read request or a write request, identifiers of particular sections of the record, updates to be applied to the record, and the like.

At block 310, the server 112 detects a type of the request received at block 305. In particular, the server 112 determines whether the request is a read request or a write request. When the request is a read request, performance of the method 300 proceeds to block 315, where the server 112 determines which sections of the requested record are to be assessed according to access control data. When the request is a write request, the server 112 instead proceeds directly to block 320, bypassing block 315.

The performance of blocks 310 and 315 enables the server 112 to identify sections of the requested record to which access is requested. A write request, in order to specify what data is to be inserted or otherwise updated into the record, explicitly specifies the sections (e.g. data fields, groups of data fields or the like) to which access is requested. The detection, by the server 112, of which sections access is requested to is therefore unnecessary.

Read requests, in contrast, may not explicitly identify sections of the record to which access is requested. Instead, such identification may arise from the presentation configuration data mentioned earlier. The presentation configuration data defines, for each requester subsystem, which sections of the records in the repository 120 are to be provided to that requester subsystem (and in what format, arrangement on a display, and the like). In other examples, read requests may also explicitly indicate which sections of the record access is requested for, and block 315 may therefore be omitted in such examples. In the present example, however, it is assumed that read requests contain only an identifier of a record, without explicit indications of which portions of that record are requested.

Figure 4:
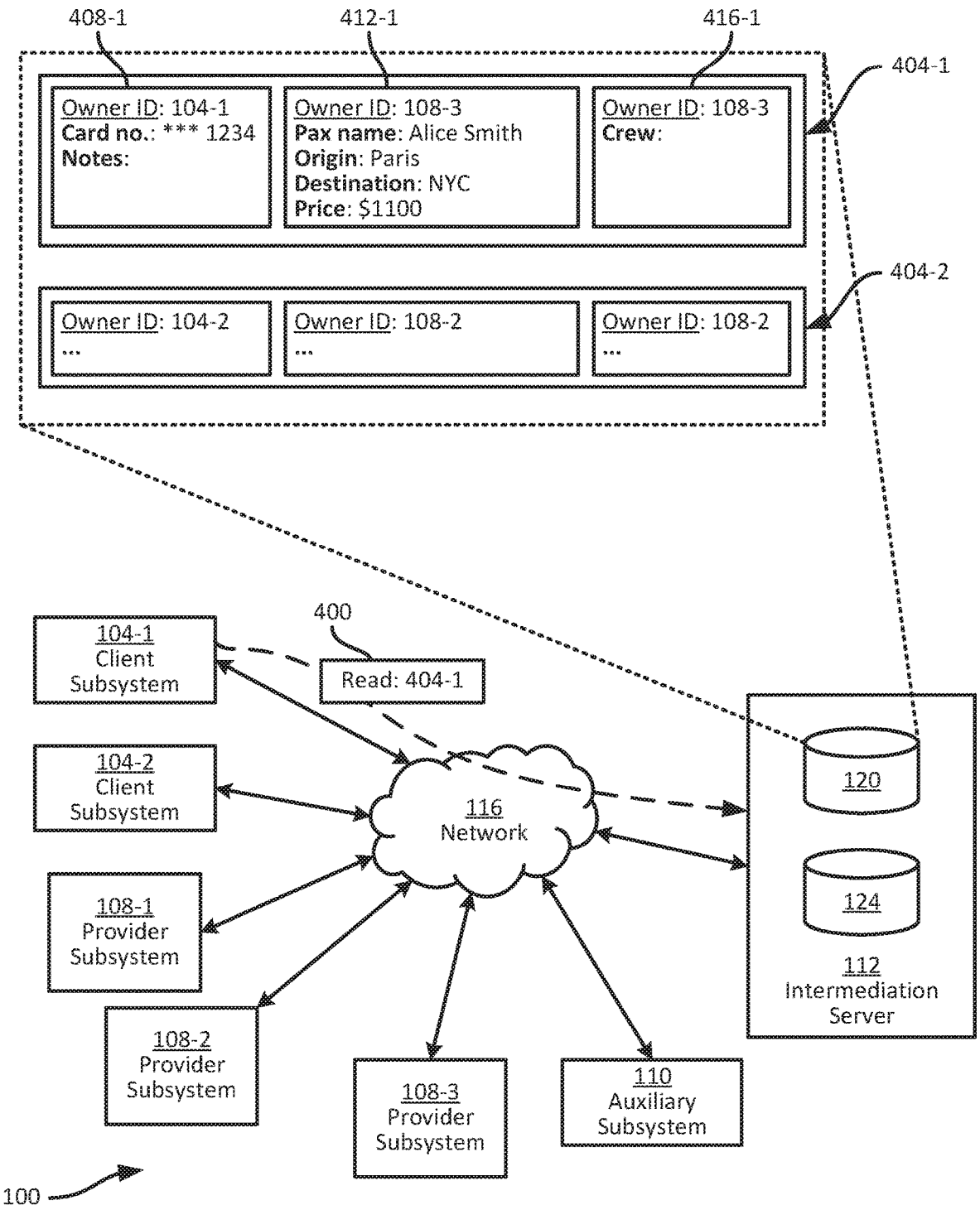
FIG. 4 is a diagram of an example performance of block 305 of the method of FIG. 3.

Turning to FIG. 4, an example request 400 is shown transmitted from the client subsystem 104-1 (which may also be referred to as the "active" requester subsystem) to the intermediation server 112. The request 400 includes at least a primary record identifier ("404-1" in the present example), and also indicates a type of request (read, in the present example). Also shown in FIG. 4 is partial content of the repository 120, including records 404-1 and 404-2. As will now be apparent, the request 400 is a request to present (e.g. display) the record 404-1 at the client subsystem 104-1. The repository 120 can contain any number of additional records 404.

Each record 404 in the repository 120 includes a predetermined set of data fields, arranged into a set of sections. In the illustrated example, the records 404 each include a first section 408 containing two fields: a payment information field, such as a payment card number; and a "notes" field. The records 404 also each include a second section 412 containing four fields (passenger name, origin city, destination city and price), and a third section 416 containing one field (crew assignment for a given flight). Example content of the sections 408-1, 412-1 and 416-1 is shown for the record 404-1. A wide variety of other fields can be included in the records 404, and those fields can be arranged into a wide variety of other sections than those shown in FIG. 4.

Each section of each record 404 is associated with an owner identifier. In the illustrated example, the sections 408-1, 412-1 and 416-1 of the record 404-1 include owner identifiers within the sections themselves, as "Owner ID" fields. In other examples, the records 404 may include a distinct section containing owner identifiers. As seen in FIG. 4, each owner identifier corresponds to one of the requester identifiers noted above. The owner identifier associated with a given section determines which requester entities have which levels of access to the relevant section.

The server 112 receives the request 400 at block 310, and at block 315, determines that the request is a read request. The server 112 therefore proceeds to block 315. At block 315 the server 112 retrieves requested section identifiers according to presentation configuration data that corresponds to the requester. Thus, in the present example, the server 112 retrieves presentation configuration data corresponding to the client subsystem 104-1. Table 1 illustrates example contents of the profile repository 124, which contains the presentation configuration data,

TABLE 1

Profile Repository 124

| Owner ID | Access Control Data | Presentation Config. Data |
|---|---|---|
| 104-1 | 408: 104-1 R/W | 408: final 4 digits Card No. |
| | | 412 |
| 104-2 | | |
| 108-1 | | |
| 108-2 | | |
| 108-3 | 412: 108-3 R/W; 104-1 R/W; 104-2 R/W | 412 |
| | 416: 108-3 R/W | 416 |
| 110 | N/A | 412: price only |

Only certain fields of Table 1 are completed for illustrative purposes; it will be understood that in practice, the repository 124 can include access control data and presentation configuration data for each requester entity.

As seen above, the profile repository 124 contains records corresponding to each requester subsystem. Each record includes an identifier of the relevant requester subsystem, indicated above as an owner identifier. The owner IDs shown in Table 1 are the reference numbers assigned to the client, provider and auxiliary subsystems shown in FIG. 1, but in other examples a wide variety of identifiers can be employed, including any suitable network address (e.g. IP address, domain, etc.). Each record defines, for the relevant owner ID, access control data specifying which requester entities have which levels of access to sections when the relevant owner ID is associated with those sections.

In the example shown above, the record for the client subsystem 104-1 indicates that when the client subsystem 104-1 is the owner of a section 408 in a record 404 (as is the case in FIG. 4, in which the section 408-1 contains the owner ID "104-1"), the client subsystem 104-1 itself has full access to that section. No other entities are permitted any form of access to the section 408. The profile repository 124 also indicates, for the provider subsystem 108-3, that when the provider subsystem 108-3 is the owner of a section 412, the provider subsystem 108-3 itself has full access to the section, and that the client subsystems 104-1 and 140-2 also have full access to the section. When the provider subsystem 108-3 is the owner of a section 416, the provider subsystem 108-3 alone has full access to that section.

Each record of the profile repository 124 also includes presentation configuration data that identifies which sections of a record in the repository 120 are to be presented to the owner ID upon request. In other examples, the access control data and the presentation configuration data can be stored in separate repositories. The presentation configuration data defines which sections of a record 404 are to be returned to a requester subsystem for display or other presentation. The presentation configuration data can also define a format in which the data is to be presented, a graphical layout in which the data is to be presented, and the like.

In some examples, the presentation configuration data can define separate presentation layouts for separate accounts, users or the like associated with the owner identifier. For example, distinct operators associated with the client subsystem 104-1 may submit requests for a given record 404. All such requests include the requester identifier "104-1", but the requests may also include sub-identifiers such as user names or the like. The profile repository 124 may define presentation configuration data specific to certain user names, groups of user names, or the like, instead of or in addition to default owner-wide presentation configuration data. In some examples, access control data can also be specified on a per-user basis, as discussed above in connection with the presentation configuration data. Similarly, owner identifiers can also include identifiers of specific accounts, users or the like in association with the identified requester subsystem.

For example, the record corresponding to the client subsystem 104-1 indicates that the client subsystem 104-1 requests presentation of a record 404, the sections 408 and 412 are returned. Further, the presentation configuration data indicates that for the payment card number field, only the final four digits are returned.

In the example shown in FIG. 4, at block 315 the server 112 retrieves the record from the profile repository 124 corresponding to the client subsystem 104-1, and determines that the sections to be returned to the client subsystem 104-1 (subject to access control determinations) are the sections 408-1 and 412-1. In other words, at block 315, from a request that may not explicitly indicate which sections of the record 400-1 are requested, the server 112 determines which sections are requested. Having made that determination, the server 112 proceeds to block 320 to assess the accessibility of the requested sections to the requesting entity (i.e. the client subsystem 104-1, in the illustrated example).

At block 320, the server 112 retrieves the owner identifiers associated with the sections of the record 404 affected by the request received at block 305. In the present example, the server 112 retrieves, from the record 404-1, the owner identifiers corresponding to the sections 408-1 and 412-1, as those are the sections specified in the presentation configuration data for the client subsystem 104-1. The owner identifiers associated with the sections 408-1 and 412-1, as seen in FIG. 4, are "104-1" and "108-3" respectively.

In the case of a write request, the section identifiers involved at block 320 are those to which the write request refers. For example, a write request may explicitly identify certain sections and the fields therein to be updated. In other examples, the write request may explicitly identify only specific fields, and the server 112 can determine the relevant sections from the common template to which all the records 404 in the repository 120 adhere.

Having retrieved or otherwise determined the section identifiers affected by the request from block 305, at block 325 the server 112 retrieves access control data based on the owner identifiers from block 320. Specifically, the server 112 retrieves access control data from the profile repository 124 for each owner identifier determined at block 320. In the example from FIG. 4, therefore, at block 325 the server 112 retrieves the access control data for the client subsystem 104-1 (for application to the section 408-1) and the provider subsystem 108-3 (for application to the section 412-1).

The server 112 is then configured to evaluate the request from block 305 according to the access control data retrieved at block 325. In particular, via respective performances of blocks 330 and 335 for each of the section identifiers from the request itself or from block 315, the server 112 compares request parameters (e.g. the requester's identifier and the type of request) to the access control data to determine whether to grant access to the relevant section.

At block 330, the server 112 selects the next section to be processed for an access determination. In the example from FIG. 4, at a first instance of block 330 the server 112 therefore selects the section 408-1. At block 335, the server 112 determines whether the requested access to the section 408-1 is permitted. The determination at block 335 can include comparing the requester identifier (e.g. an identifier of the client subsystem 104-1) to the requester identifiers from the access control data, as well as the request type to the type of request permitted in the access control data. In the present example, the owner of the section 408-1 is the client subsystem 104-1 itself, and the access control data indicates that the client subsystem 104-1 has full (i.e. read and write) access to sections 408 in which the client subsystem 104-1 is identified as the owner. The determination at block 335 is therefore affirmative, and at block 340 a decision to grant access to the section 408-1 is stored at the server 112.

When the determination at block 335 is negative (e.g. if the client subsystem 104-1 had submitted a request to read the section 416-1 of the record 404-1), at block 345 the server 112 stores a decision to deny access to the relevant section of the record 404. In other words, access may be granted or denied by the server 112 on a section-by-section basis, and the request from block 305 may receive a partial response if the requester is permitted access to only a subset of the requested sections. In other examples, access may be granted or denied to the request as a whole. In such examples, a single negative determination at block 335 (that is, for one section) can lead to a denial of access for the request as a whole, notwithstanding the fact that access to any other requested sections may have been permissible.

At block 350, the server 112 determines whether further sections remain to be assessed. In the example of FIG. 4, the determination at block 350 is affirmative because the section 412-1 remains to be assessed. The server 112 therefore performs block 330 and 335 for the section 412-1. At the second instance of block 335, the determination is also affirmative because, as shown in Table 1, the access control data corresponding to the provider subsystem 108-3 (the owner of the section 412-1) indicates that the client subsystem 104-1 has read and write access to sections 412.

A further performance of block 350 is negative in the present example because only the sections 408-1 and 412-1 are requested. The server 112 therefore proceeds to block 355, at which the server 112 responds to the request from block 305 according to the access determinations at blocks 340 and/or 345. In the example of FIG. 4, the server 112 returns the sections 408-1 and 412-1 of the record 404-1 to the client subsystem 104-1 in response to the request 400, with the response being formatted according to the presentation configuration data in the repository 124 that corresponds to the client subsystem 104-1.

In the case of write requests, the performance of block 355 can include updating the record as requested at block 305, or partially updating the record if the requester subsystem is permitted to update some of the requested sections but not others. The server 112 can return a message to the requester entity at block 355 indicating which updates have been applied to the record 404.

Figure 5:
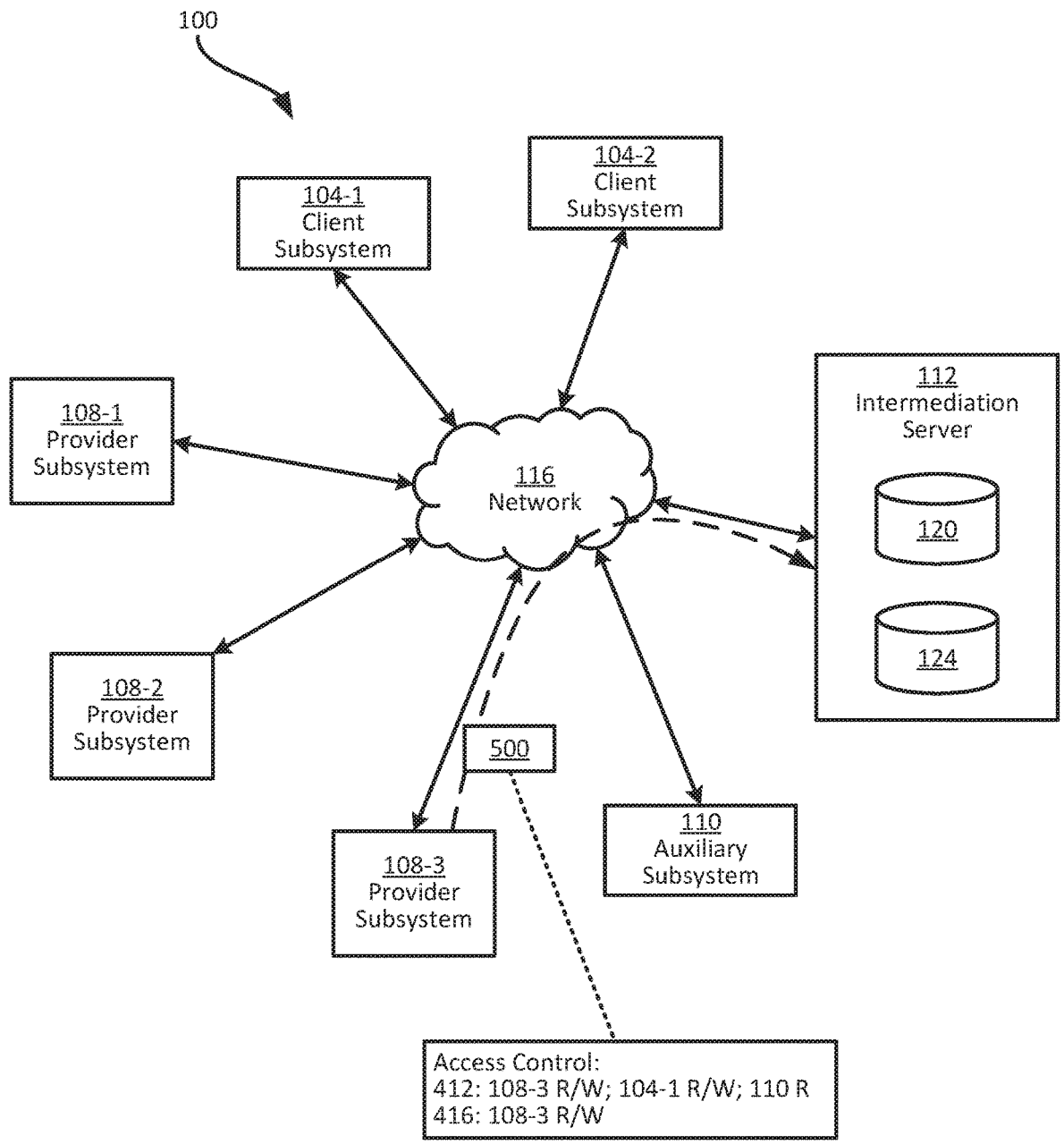
FIG. 5 is a diagram illustrating an update of access control data employed in the method of FIG. 3.

The access control data and presentation configuration data corresponding to any given requester subsystem identified in the repository 124 can be updated. For example, a given requester subsystem can transmit a request to the server 112 to update either or both of the access control data and presentation configuration data in the repository 124 that corresponds to that requester subsystem. FIG. 5 illustrates a request 500 from the provider subsystem 108-3 containing updated access control data. In response to receiving the request 500, the server 112 can update the repository 124 as shown below in Table 2.

TABLE 2

| Profile Repository 124 | | |
| --- | --- | --- |
| Owner ID | Access Control Data | Presentation Config. Data |
| 104-1 | 408: 104-1 R/W | 408: final 4 digits Card No. 412 |
| 104-2 | | |
| 108-1 | | |
| 108-2 | | |
| 108-3 | 412: 108-3 R/W; 104-1 R/W; 110 R | 412 |
| | 416: 108-3 R/W | 416 |
| 110 | N/A | 412: price only |

As shown in Table 2, the access control data corresponding to the provider subsystem 108-3 indicates that the client subsystem 104-2 no longer has access to sections 412 with the provider subsystem 108-3 indicated as owner, and that the auxiliary subsystem 110 has read access to such sections. Presentation configuration data can also be updated by the relevant requester subsystem. That is, the client subsystem 104-1 can update the presentation configuration data shown above by request to the server 112. In some examples, the server 112 can determine whether updated presentation configuration data and/or access control data leads to conflicts. For example, if the client subsystem 104-1 updates the presentation configuration data to include a reference to the section 416, the server 112 can determine that no access control data permits access to the section 416 to the client subsystem 104-1. The server 112 can therefore prevent the above update to the presentation configuration data, or can simply generate a warning message for transmission to the client subsystem 104-1 indicating the existence of the conflict.

Requests to update access control data and/or presentation configuration data may also be evaluated according to the access control data itself, or according to a baseline set of access control data in the event that no access control data is specified for a given requester subsystem. Such baseline, or default, access control data can also be applied to access requests in addition to update requests. For example, according to the contents of Table 2, the provider subsystem 108-3 has full access to sections 416 and may therefore be permitted to grant access to sections 416 to the client subsystem 104-1. The client subsystem 104-1, however, would not be permitted to grant such access to itself.

As shown in Tables 1 and 2, certain requester subsystems may not have access control data stored in association therewith in the profile repository 124. The auxiliary subsystem 110 may not submit requests to the server 112 for access to data. Instead, other requesters (e.g. the provider subsystems 108) may send requests to the server 112 to forward certain data to the auxiliary subsystem 110. In other examples, the server 112 can automatically generate requests internally to forward such data to the auxiliary subsystem 110, for example in response to certain updates to records 404. The repository 124 therefore does not contain access control data for the auxiliary subsystem 110, but does contain presentation configuration data, indicating that the auxiliary subsystem 110 receives only the price field of the section 412. Further, as shown in Table 2, the auxiliary subsystem 110 receives such data only when the provider subsystem 108-3 is the owner indicated for the relevant section 412.

The owner identifier associated with a section of a record 404 may also be updated, for example in response to a request from the currently identified owner. Further, in some examples more than one owner identifier can be indicated in a section of a record 404. In such examples, the server 112 retrieves two or more sets of access control data at block 325.

Figure 6:
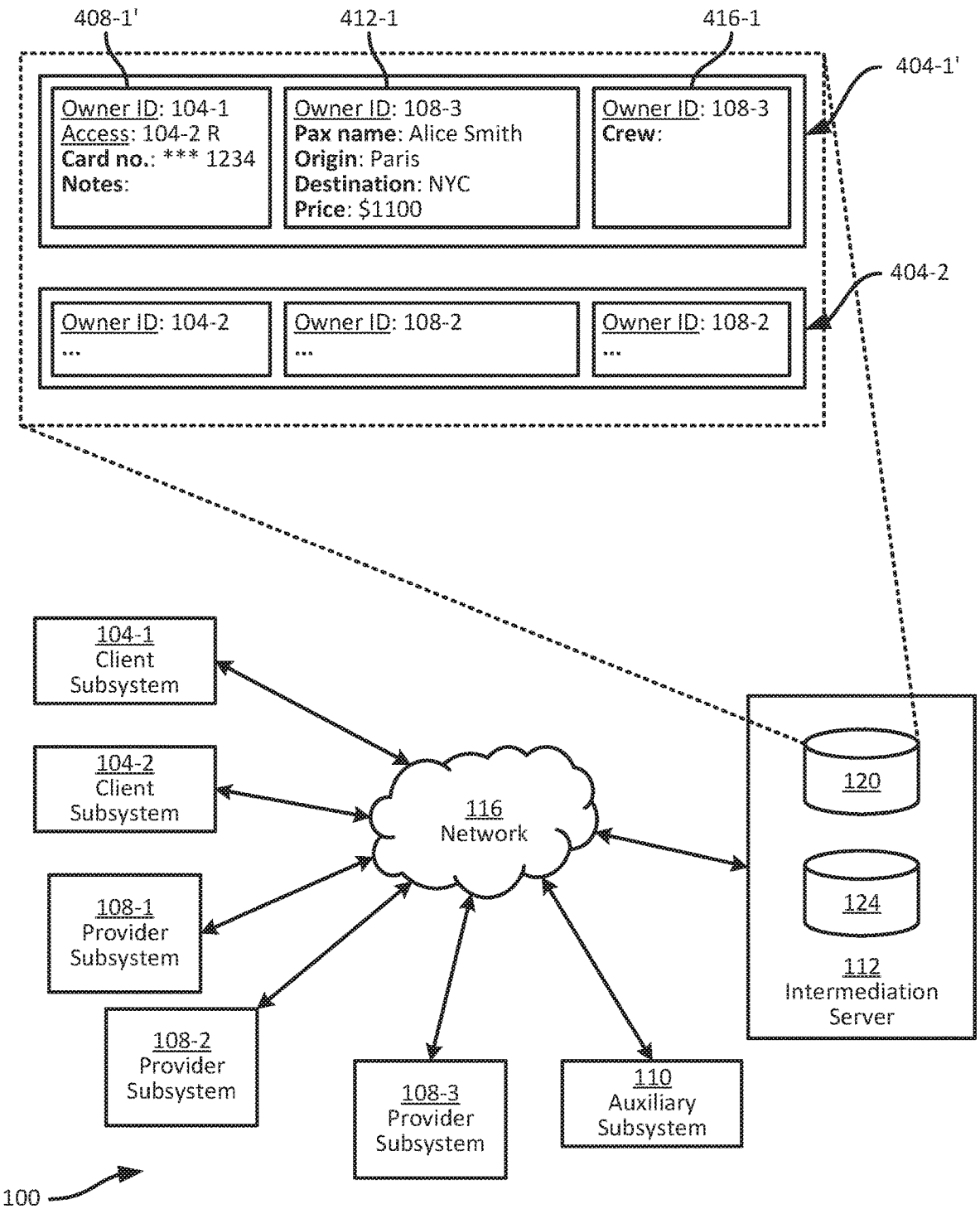
FIG. 6 is a diagram illustrating another storage mechanism for access control data employed in the method of FIG. 3.

In the examples discussed above, access control data is stored outside the repository 120. In some examples, however, the access control data can be stored partially or entirely within the records 404 themselves. For example, rather than an owner identifier as shown in FIG. 4, a record 404-1' as shown in FIG. 6 includes both an owner identifier in the section 408-1', and access control data. In the illustrated example, the access control data indicates that the client subsystem 104-2 has read access to the section 408-1'. Such in-record access control data can be additive to access control data in the repository 124. That is, both the in-record access control data and the repository 124 can be considered to grant or deny access to a record. In other examples, in-record access control data can override access control data in the repository, e.g. replacing any access control data in the repository 124 entirely.

In some examples, one or more sections of a record 404 can be encrypted. For example, each section of a record can be encrypted with an encryption key corresponding to the identified owner of that section, and the relevant decryption key can be provided to requester subsystems permitted to access the section according to the access control data.

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of data access control, comprising:
storing, at an intermediation server, a plurality of records, each record containing:
 (i) a primary record identifier;
 (ii) a plurality of sections each containing data; and
 (iii) a plurality of owner identifiers associated with respective ones of the sections, each owner identifier selected from a set of requester identifiers corresponding to respective requester subsystems;
storing, at the intermediation server, presentation configuration data defining, for each of the requester subsystems, (i) a presentation subset of the sections, and (ii) formatting data corresponding to the presentation subset;
storing, at the intermediation server, access control data corresponding to each requester identifier and distinct from the plurality of records; wherein the access control data for a given requester identifier indicates which other requester identifiers are permitted to access sections of any of the plurality of records having the given requester identifier associated therewith as the owner identifier, and wherein the access control data omits the primary record identifiers;
responsive to receiving, at the intermediation server from an active one of the requester subsystems, a request containing (i) the primary record identifier of a record selected from the plurality of records, and (ii) an active one of the requester identifiers corresponding to the active requester subsystem:
 granting access to a subset of the sections selected from the presentation subset corresponding to the active requester subsystem, according to: the active requester identifier, the owner identifiers of the presentation subset of the sections, and the access control data corresponding to each of the owner identifiers of the presentation subset of the sections.

2. The method of claim 1, wherein granting access to the subset of the sections comprises retrieving the subset of the sections from the record and transmitting the subset of the sections to the active requester subsystem.

3. The method of claim 2, wherein transmitting the subset of the sections comprises arranging the subset of the sections according to the formatting data in the presentation configuration data, for display at the requester subsystem.

4. The method of claim 3, further comprising:
receiving, at the intermediation server from one of the requester subsystems, updated presentation configuration data corresponding to the one of the requester subsystems; and
updating the presentation configuration data.

5. The method of claim 1, wherein the access control data is stored in a configuration repository.

6. The method of claim 5, wherein the access control data includes default access control data stored in the configuration repository.

7. The method of claim 1, wherein the access control data further includes override access control data stored within at least one of the plurality of records.

8. The method of claim 1, further comprising:
receiving, at the intermediation server from one of the requester subsystems, updated access control data corresponding to the one of the requester subsystems; and
updating the access control data.

9. The method of claim 1, wherein each of the sections includes one or more distinct data fields.

10. The method of claim 1, wherein at least one of the sections contains data created through the New Distribution Capability (NDC) standard.

11. The method of claim 1, further comprising:
receiving, at the intermediation server, a request to replace an initial owner identifier of a section with a new owner identifier; and
replacing the initial owner identifier with the new owner identifier.

12. An intermediation server, comprising:
a communications interface;
a memory configured to store:
 a plurality of records, each record containing (i) a primary record identifier; (ii) a plurality of sections each containing data; and (iii) a plurality of owner identifiers associated with respective ones of the sections, each owner identifier selected from a set of requester identifiers corresponding to respective requester subsystems;
 access control data corresponding to each requester identifier and distinct from the plurality of records; wherein the access control data for a given requester identifier indicates which other requester identifiers are permitted to access sections of any of the plurality of records having the given requester identifier associated therewith as the owner identifier, and wherein the access control data omits the primary record identifiers; and
 presentation configuration data defining, for each of the requester subsystems, (i) a presentation subset of the sections of a record selected from the plurality of records, and (ii) formatting data corresponding to the presentation subset
a processor interconnected with the memory and the communications interface, the processor configured to:
responsive to receipt, from an active one of the requester subsystems, a request containing (i) the primary record identifier and (ii) an active one of the requester identifiers corresponding to the active requester subsystem:
grant access to a subset of the sections selected from the presentation subset corresponding to the active requester subsystem, according to the active requester identifier, the owner identifiers of the presentation subset of the sections and the access control data corresponding to each of the owner identifiers of the presentation subset of the sections.

13. The intermediation server of claim 12, wherein the processor is configured, in order to grant access to the subset of the sections, to; retrieve the subset of the sections from the record and transmit the subset of the sections to the active requester subsystem.

14. The intermediation server of claim 13, wherein the processor is further configured, in order to transmit the subset of the sections, to arrange the subset of the sections according to the formatting data in the presentation configuration data for display at the requester subsystem.

15. The intermediation server of claim 14, wherein the processor is further configured to:
receive from one of the requester subsystems, updated presentation configuration data corresponding to the one of the requester subsystems; and
update the presentation configuration data in the memory.

16. The intermediation server of claim 12, wherein the access control data is stored in a configuration repository.

17. The intermediation server of claim 16, wherein the access control data includes default access control data stored in the configuration repository.

18. The intermediation server of claim 12, wherein the access control data further includes override access control data stored within at least one of the records.

19. The intermediation server of claim 12, wherein the processor is further configured to:
receive, from one of the requester subsystems, updated access control data corresponding to the one of the requester subsystems; and
update the access control data in the memory.

20. The intermediation server of claim 12, wherein each of the sections includes one or more distinct data fields.

21. The intermediation server of claim 12, wherein at least one of the sections contains data created through the New Distribution Capability (NDC) standard.

22. The intermediation server of claim 12, wherein the processor is further configured to:
receive a request to replace an initial owner identifier of a section with a new owner identifier; and
replace the initial owner identifier with the new owner identifier.

23. A non-transitory computer-readable medium storing computer-readable instructions executable by a processor of an intermediation server to cause the intermediation server to:
store, at the intermediation server, a plurality of records, each record containing:
 (i) a primary record identifier;
 (ii) a plurality of sections each containing data; and
 (iii) a plurality of owner identifiers associated with respective ones of the sections, each owner identifier selected from a set of requester identifiers corresponding to respective requester subsystems;
store, at the intermediation server, presentation configuration data defining, for each of the requester subsystems, (i) a presentation subset of the sections, and (ii) formatting data corresponding to the presentation subset;
store, at the intermediation server, access control data corresponding to each requester identifier and distinct from the plurality of records; wherein the access control data for a given requester identifier indicates which other requester identifiers are permitted to access sections of any of the plurality of records having the given requester identifier associated therewith as the owner identifier, and wherein the access control data omits the primary record identifiers;
responsive to receipt, at the intermediation server from an active one of the requester subsystems, of a request containing (i) the primary record identifier of a record selected from the plurality of records and (ii) an active one of the requester identifiers corresponding to the active requester subsystem:
grant access to a subset of the sections selected from the presentation subset corresponding to the active requester subsystem, according to the active requester identifier, the owner identifiers of the presentation subset of the sections and the access control data corresponding to each of the owner identifiers of the presentation subset of the sections.

\* \* \* \* \*